Oct. 20, 1925.
R. H. O'BRIEN
1,557,869
DEMOUNTABLE RIM LOCK
Filed June 9, 1925
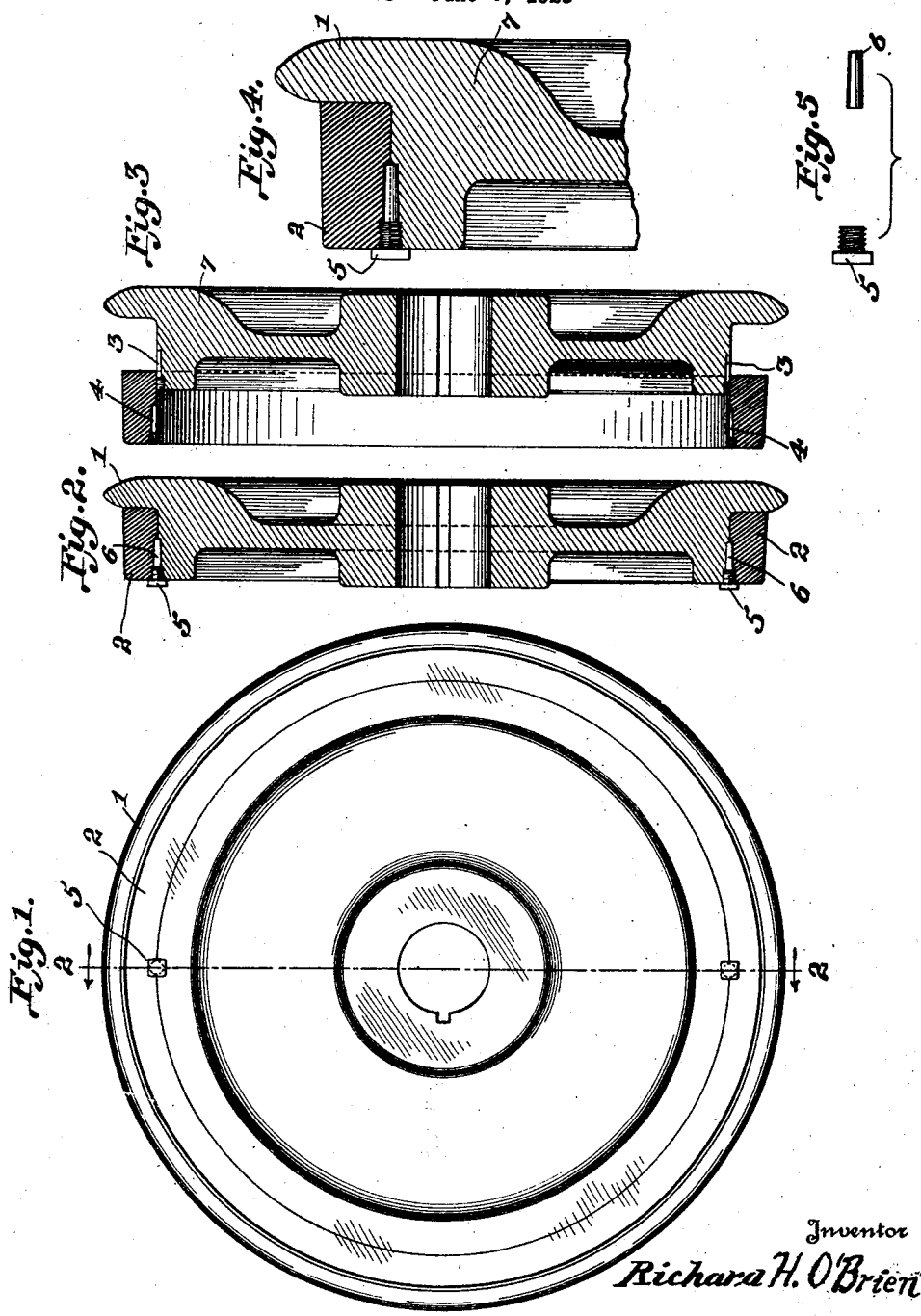
Inventor
Richard H. O'Brien
By Mason Fenwick & Lawrence,
Attorneys Patented Oct. 20, 1925.

1,557,869

UNITED STATES PATENT OFFICE.

RICHARD H. O'BRIEN, OF FOREST CITY, PENNSYLVANIA.

DEMOUNTABLE-RIM LOCK.

Application filed June 9, 1925. Serial No. 36,018.

*To all whom it may concern:*

Be it known that I, RICHARD H. O'BRIEN, citizen of the United States, residing at Forest City, in the county of Susquehanna and State of Pennsylvania, have invented certain new and useful Improvements in a Demountable-Rim Lock; and I do hereby declare the following to be a full, clear, and exact description of the invention, such as will enable others skilled in the art to which it appertains to make and use the same.

The prime object of this invention is to provide means for interlocking a wheel rim with a tire band in such a manner that the tire band will not warp loose from the rim when subjected to jolts or hard use.

Other objects will appear from the following description of the device, and the single sheet of drawings which are a part of this application.

In the drawings,

Fig. 1 designates a plan view of a wheel and tire;

Fig. 2 represents a sectional view taken through 2—2 of Fig. 1;

Fig. 3 illustrates a sectional view taken through a diameter of the wheel and tire, showing the tire partly removed from the wheel.

Fig. 4 illustrates a sectional view of a portion of the wheel and tire, drawn to an enlarged scale, and showing the wheel rim and tire in interlocked relationship.

Fig. 5 designates a plan view of the plug and dowel pin.

Numeral 1 designates a flange portion of a wheel, usually made from cast iron or cast steel; if the wheel is made from cast iron, the flange is chilled, while the tire 2 is constructed from soft steel or other suitable material, and shrunk on the wheel. Suitable holes are drilled in the wheel and tire, half of the hole being in wheel as at 3, and half in the tire as at 4, a tapered dowel pin 6, having a length less than the depth of the hole is then driven in, and the hole tapped to receive a threaded plug 5, which functions to hold the tire firmly in place on the wheel, and to prevent it from coming off or working loose from the wheel in case the wheel and tire receives a hard bump or otherwise. It is understood that any number of dowel pins and plugs may be used without departing from the spirit of this invention.

It has been found that wheels now in use get double flanged in a short time from wear and otherwise, and when changed are thrown away for scrap. It is estimated that where four months' service may be obtained from a cast iron wheel, under ordinary use, twelve may be obtained from a steel tire. By this invention, one set of wheels may be tired approximately five times before the wheel is considered unfit for further service.

What I claim is:

The combination with a wheel rim of a tire comprised of soft steel and shrunk on the rim, of a hole half in the rim and half in the tire, and of means for interlocking the rim and tire together consisting of a dowel pin driven into the hole, the dowel pin being less in length than the depth of the hole, and being firmly held in place by means of a threaded plug screwed into the hole at the end of the pin.

In testimony whereof I affix my signature.

RICHARD H. O'BRIEN.